US012560742B2

(12) United States Patent
Zhang et al.

(10) Patent No.:  US 12,560,742 B2
(45) Date of Patent:      Feb. 24, 2026

(54) CHARACTERIZATION OF SUBSURFACE GEOLOGICAL FORMATIONS

(71) Applicant: Saudi Arabian Oil Company, Dhahran (SA)

(72) Inventors: Xingquan Zhang, Dhahran (SA); Neelesh R. Tripathi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 526 days.

(21) Appl. No.: 18/089,255

(22) Filed: Dec. 27, 2022

(65) Prior Publication Data

US 2024/0210591 A1     Jun. 27, 2024

(51) Int. Cl.
*G01V 20/00*        (2024.01)
*G01V 11/00*        (2006.01)

(52) U.S. Cl.
CPC ............ *G01V 20/00* (2024.01); *G01V 11/002* (2013.01)

(58) Field of Classification Search
CPC .............................. G01V 20/00; G01V 11/002
See application file for complete search history.

(56) References Cited

U.S. PATENT DOCUMENTS

| | | |
|---|---|---|
| 5,850,560 A | 12/1998 | Kang |
| 5,995,906 A | 11/1999 | Doyen et al. |
| 6,490,526 B2 | 12/2002 | Matteucci et al. |
| 9,355,070 B2 | 5/2016 | Thorne |
| 9,448,313 B2 | 9/2016 | Hofland et al. |
| 9,817,143 B2 | 11/2017 | Groenestijn |

| | | |
|---|---|---|
| 9,959,144 B2 | 5/2018 | Callegari et al. |
| 10,061,046 B2 | 8/2018 | Hofland et al. |
| 11,248,448 B2 | 2/2022 | Zhang |

(Continued)

FOREIGN PATENT DOCUMENTS

| | | |
|---|---|---|
| EP | 3004947 A1 | 4/2016 |
| EP | 3756110 A1 | 12/2020 |

(Continued)

OTHER PUBLICATIONS

Basarir et al., "Geostatistical modeling of spatial variability of SPT data for a borax stockpile site," Engineering Geology, Apr. 2010, 114:154-163, 10 pages.

(Continued)

*Primary Examiner* — Mi'schita' Henson
(74) *Attorney, Agent, or Firm* — Fish & Richardson P.C.

(57)                    ABSTRACT

Systems and methods for characterizing a subsurface formation include: measuring a property of the subsurface formation at a plurality of locations; storing values of the property of the subsurface formation at the plurality of locations; defining a distance of influence for the property in the subsurface formation based on the property and on a degree of heterogeneity of the subsurface formation; identifying clusters of locations that are located within the distance of influence of each other; for each cluster identified, calculating an average value of the property of the subsurface formation in the cluster; for each cluster identified, replacing multiple values of the property and locations of the identified cluster with the average value of the property of the subsurface formation in the cluster at a single location; and calculating summary statistics of the reduced data set.

19 Claims, 9 Drawing Sheets

(56) References Cited

U.S. PATENT DOCUMENTS

| | | | |
|---|---|---|---|
| 11,693,150 B2 | 7/2023 | Zhang | |
| 2006/0241920 A1 | 10/2006 | Le Ravalec-Dupin | |
| 2009/0260415 A1* | 10/2009 | Suarez-Rivera | G01N 33/241 |
| | | | 73/78 |
| 2016/0146973 A1 | 5/2016 | Johnson | |
| 2018/0275301 A1 | 9/2018 | Ma et al. | |
| 2022/0179883 A1* | 6/2022 | Biernacki | G06F 16/355 |

FOREIGN PATENT DOCUMENTS

| | | | | |
|---|---|---|---|---|
| WO | WO-2012108917 A1 * | 8/2012 | | G06F 30/20 |
| WO | WO 2020142257 | 7/2020 | | |

OTHER PUBLICATIONS

Bourgault, "Using Non-Gaussian Distributions in Geostatistical Simulations," Mathematical Geology, 1997, 29(3):315-334, 20 pages.

Deutsch et al., "GSLIB: Geostatistical Software Library and User's Guide," 2nd Edition, Oxford University Press, 1997, New York, New York, 375 pages.

Emery et al., "Histogram and variogram inference in the multigaussian model," Stochastic environmental research and risk assessment, Feb. 2005, 19(1):48-58, 17 pages.

Kerry et al., "Determining the effect of asymmetric data on the variogram. I. Underlying asymmetry," Computers & Geosciences, Oct. 2007, 33(10):1212-1232, 21 pages.

Prades et al., "Geostatistics and clustering for geochemical data analysis," Thesis for the degree of Master of Science in Mining Engineering, University of Alberta, 2017, 96 pages.

Pyrcz et al., "Geostatistical Reservoir Modeling, " 2nd Edition, 2014, Oxford University Press, New York, New York, pp. 53-58, 6 pages.

Qu et al., "Geostatistical simulation with a trend using gaussian mixture models," Natural Resources Research, Aug. 2017, 27(3):347-363, 17 pages.

Zhang et al., "Geostatistics for Spatial Uncertainty Characterization," Geo-Spatial Information Science, Mar. 2009, 12(1):7-12, 6 pages.

SAIP Examination Report in Saudi Arabian Appln. No. 123451089, dated Mar. 18, 2025, 9 pages (with English translation).

* cited by examiner

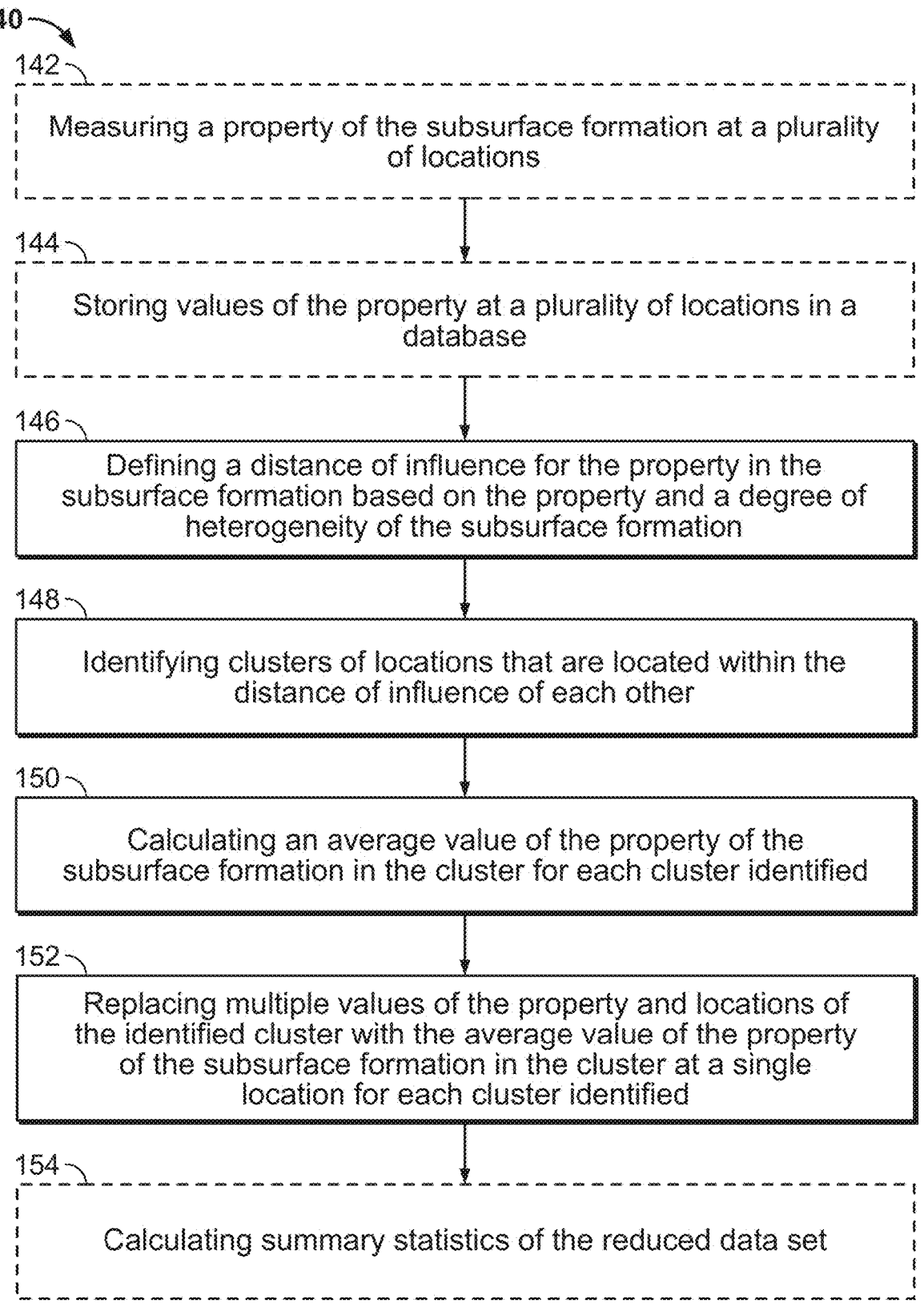

140

142
Measuring a property of the subsurface formation at a plurality of locations 144
Storing values of the property at a plurality of locations in a database 146
Defining a distance of influence for the property in the subsurface formation based on the property and a degree of heterogeneity of the subsurface formation 148
Identifying clusters of locations that are located within the distance of influence of each other 150
Calculating an average value of the property of the subsurface formation in the cluster for each cluster identified 152
Replacing multiple values of the property and locations of the identified cluster with the average value of the property of the subsurface formation in the cluster at a single location for each cluster identified 154
Calculating summary statistics of the reduced data set

FIG. 2

| Number of data 2500 | |
|---|---|
| mean | 2.1565199 |
| std. dev. | 2.9733506 |
| coef. of var | 1.3787726 |
| maximum | 22.7500000 |
| upper quartile | 2.7434093 |
| median | 1.0146345 |
| lower quartile | 0.3207125 |
| minimum | 0.0600000 |

| Number of data 140 | |
| --- | --- |
| mean | 2.4846357 |
| std. dev. | 4.0175215 |
| coef. of var | 1.6169459 |
| maximum | 24.7330000 |
| upper quartile | 2.8530000 |
| median | 0.8190000 |
| lower quartile | 0.2440000 |
| minimum | 0.0000000 |

| Number of data 140 | |
| --- | --- |
| mean | 0.9999929 |
| std. dev. | 1.0035738 |
| coef. of var | 1.0035810 |
| maximum | 4.7020000 |
| upper quartile | 1.6387500 |
| median | 0.6790000 |
| lower quartile | 0.1357500 |
| minimum | 0.0000000 |

CHARACTERIZATION OF SUBSURFACE GEOLOGICAL FORMATIONS

TECHNICAL FIELD

This disclosure relates to characterization of subterranean geological formations.

BACKGROUND

In the oil and gas industry, great efforts are exerted to characterize reservoir heterogeneities by measuring properties of the subsurface formation and then building geologically realistic geostatistical simulation models. The goodness of a model is measured by how well the model reproduces the global mean value, histogram, and continuity structures of the input dataset; therefore, a key task before generating a model is to evaluate how well the input dataset represents the underlying geological formations.

In practice, the measurement of properties of subsurface formations are often collected in a nonuniform and potentially unrepresentative manner over the region of interest owing to the high cost of drilling and core collection. When multiple measurement locations occur in close proximity to each other a data cluster is formed, which can skew the global statistics of the measurement dataset since some regions will be overrepresented. Thus, there is a need to adjust the histograms and summary statistics of the dataset to be more representative of the entire region of interest. Declustering methods can be applied to estimate the global statistics and to build unbiased histograms to characterize the subsurface formation.

SUMMARY

This specification describes techniques for characterizing subsurface geological formations. Properties of a geological formation are measured at a plurality of locations that may be unevenly distributed throughout the formation of interest. The measured values are stored in a database whose global summary statistics (e.g., mean and standard deviation) may be biased if the stored property values include clusters of measurement locations that are unrepresentative of the underlying formation due, for example, to oversampling in some locations. To reduce the bias introduced by the clusters of measurement locations, a distance of influence is defined based on the property being measured and the degree of heterogeneity of the underlying formation. Clusters are identified by finding locations that occur within the distance of influence of each other. For each cluster identified, an average value of the measured property is calculated. For each cluster identified, the value of the property at multiple locations is replaced by the average value of the property of the cluster at a single location forming a reduced dataset. Summary statistics are then calculated for the reduced dataset.

In one aspect, methods for characterizing a subsurface formation include: measuring a property of the subsurface formation at a plurality of locations; storing values of the property of the subsurface formation at the plurality of locations in a database; defining a distance of influence for the property in the subsurface formation based on the property and on a degree of heterogeneity of the subsurface formation; identifying clusters of locations that are located within the distance of influence of each other; for each cluster identified, calculating an average value of the property of the subsurface formation in the cluster; for each cluster identified, replacing multiple values of the property and locations of the identified cluster with the average value of the property of the subsurface formation in the cluster at a single location; and calculating summary statistics of the reduced data set.

In one aspect, systems for characterizing a subsurface formation include: One or more processing devices and one or more non-transitory machine-readable storage devices storing instructions that are executable by the one or more processing devices to cause performance of operations including: defining a distance of influence for the property in the subsurface formation based on the property and on a degree of heterogeneity of the subsurface formation; identifying clusters of locations that are located within the distance of influence of each other; for each cluster identified, calculating an average value of the property of the subsurface formation in the cluster; for each cluster identified, replacing multiple values of the property and locations of the identified cluster with the average value of the property of the subsurface formation in the cluster at a single location; and calculating summary statistics of the reduced data set.

In one aspect, one or more non-transitory machine-readable storage devices storing instructions for characterizing a subsurface formation, the instructions being executable by one or more processing devices to cause performance of operations including: defining a distance of influence for the property in the subsurface formation based on the property and on a degree of heterogeneity of the subsurface formation; identifying clusters of locations that are located within the distance of influence of each other; for each cluster identified, calculating an average value of the property of the subsurface formation in the cluster; for each cluster identified, replacing multiple values of the property and locations of the identified cluster with the average value of the property of the subsurface formation in the cluster at a single location; and calculating summary statistics of the reduced data set.

Embodiments of these systems, methods and devices can include one or more of the following features.

In some embodiments, measuring the property of the subsurface formation comprises drilling a test well in the subsurface formation. In some cases, these aspects further include logging the test well in the subsurface formation.

In some embodiments, the property is a continuous property. In some cases, the continuous property is one or more of porosity, permeability and water saturation, wireline logs such as gamma ray logging, or interpreted properties such as fracture density and aperture.

In some embodiments, the distance of influence varies with direction.

In some embodiments, defining a distance of influence includes assessing reservoir heterogeneity and main depositional direction.

In some embodiments, the average value for a cluster of locations is based on an equal weighting of the values of the property at the locations of the cluster of locations.

In some embodiments, the distance of influence of the property is different in different directions.

In some embodiments, these aspects further include modelling an oil reservoir within the subsurface formation.

Certain implementations may have particular advantages. The approach of this disclosure is based on the intrinsic definition of clustering; that is, the closeness of locations where properties of the formation have been measured. The distance of influence can be defined based on the underlying geology of the formation and is independent of a discretization of the region of interest or boundary conditions. This approach is stable and can lead to more accurate estimation of target summary statistics. This approach can implement averaging weights that are determined solely by the distance of influence. Reservoir heterogeneity is another key parameter that can be considered. For a homogeneous formation, for example, shoreface sand deposition, the influence distance could be larger than a heterogeneous formation, for example, fluvial deposition. In some implementations of this approach, the average value should represent the reservoir property at that location within the given distance of influence. This approach can allow input from various sources including a sedimentologist, a geological modeler or a geostatistician to choose an appropriate distance of influence for a formation. Users can also test a set of distances of influence and choose the one which is believed to represent the whole formation.

The details of one or more embodiments of these systems and methods are set forth in the accompanying drawings and the description below. Other features, objects, and advantages of the systems and methods will be apparent from the description and drawings, and from the claims.

DESCRIPTION OF DRAWINGS

FIG. 2 is a flow diagram of an example implementation of the characterization method.

Like reference symbols in the various drawings indicate like elements.

DETAILED DESCRIPTION

This specification describes an approach for characterizing a subsurface geological formation. This approach includes taking measurements of one or more properties of a subsurface formation at a plurality of locations and constructing a database wherein biases related to clustered measurements have been reduced.

Figure 1:
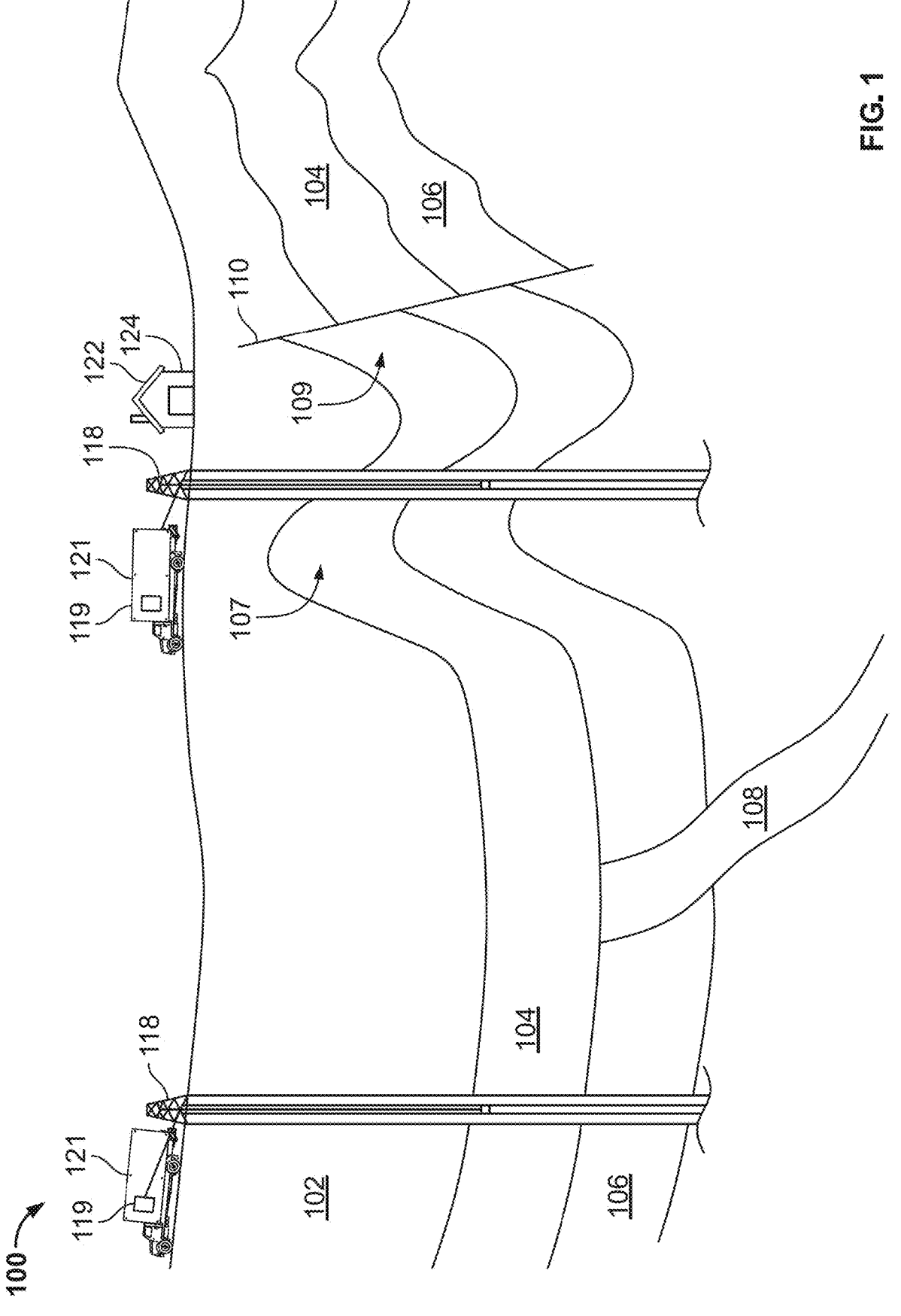
FIG. 1 is a schematic view of a survey being performed to measure properties of a subterranean formation.

FIG. 1 is a schematic view of a subterranean formation with features such as facies and faults in a subterranean formation 100. Methods of measuring the properties of the source rock within the subterranean formation include drilling test wells or collecting core samples. The subterranean formation 100 includes a layer of impermeable cap rock 102 at the surface. Facies underlying the impermeable cap rocks 102 include a sandstone layer 104, a limestone layer 106, and a sand layer 108. A fault line 110 extends across the sandstone layer 104 and the limestone layer 106.

Oil and gas tend to rise through permeable reservoir rock until further upward migration is blocked, for example, by the layer of impermeable cap rock 102. Seismic surveys attempt to identify locations where interaction between layers of the subterranean formation 100 are likely to trap oil and gas by limiting this upward migration. For example, FIG. 1 shows an anticline trap 107, where the layer of impermeable cap rock 102 has an upward convex configuration, and a fault trap 109, where the fault line 110 might allow oil and gas to flow in with clay material between the walls trapping the petroleum. Other traps include salt domes and stratigraphic traps.

One or more test wells 118 can be drilled into the subsurface formation to measure the properties of the source rock within the formation. A control center 122 can be operatively coupled to a well logging unit 121 and other data acquisition and wellsite systems. The control center 122 may have computer facilities for receiving, storing, processing, and analyzing data from the well logging unit 121 and other data acquisition and wellsite systems that provide additional information about the subterranean formation. For example, the control center 122 can receive data from a computer 119 associated with a well logging unit 121. For example, computer systems 124 in the control center 122 can be configured to analyze, model, control, optimize, or perform management tasks of field operations associated with development and production of resources such as oil and gas from the subterranean formation 100. Alternatively, the computer systems 124 can be located in a different location than the control center 122. Some computer systems are provided with functionality for manipulating and analyzing the data, such as performing seismic interpretation or borehole resistivity image log interpretation to identify geological surfaces in the subterranean formation or performing simulation, planning, and optimization of production operations of the wellsite systems.

Well data (e.g., well logging data and core data) is associated with specific locations in the reservoir. Various constraints can result in these locations being clustered with some wells close to each other and others spaced farther apart. This spacing can result in oversampling certain portions of the reservoir and cause biases in the analysis of properties of the subsurface formation.

Figure 3:
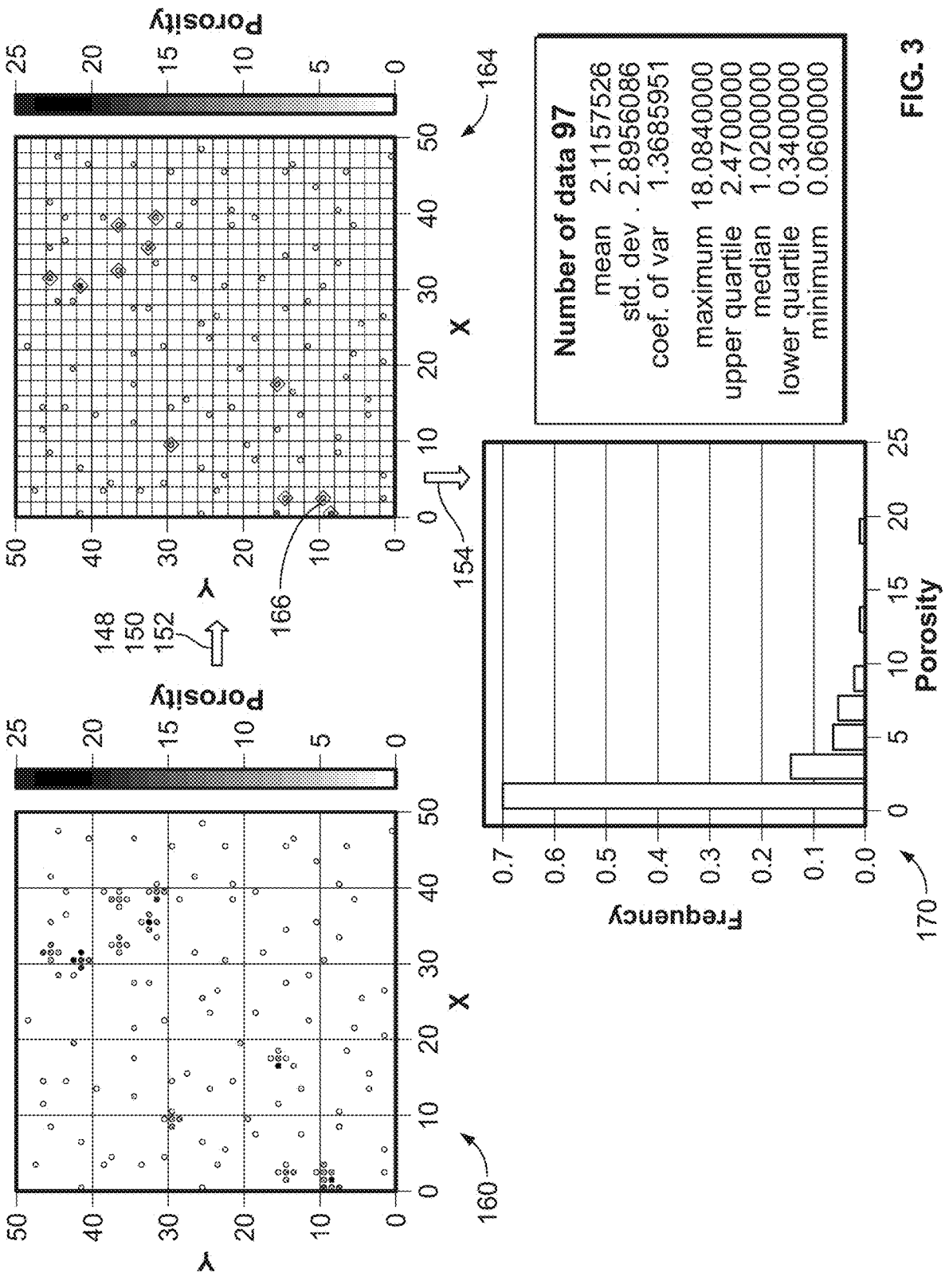
FIG. 3 shows results from an example implementation of a characterization method.

FIG. 2 is a flow diagram of a method 140 of characterizing a subsurface formation. FIG. 3 shows the results from an implementation of this approach. This approach includes taking measurements of one or more properties of a subsurface formation at a plurality of locations and constructing a database wherein biases related to clustered measurements have been reduced.

The method 140 uses measurements of the properties of subsurface formations, such as porosity, permeability, wireline logs including gamma ray wireline logs, and interpreted shale content to characterize the subsurface formation to, for example, quantify the heterogeneity of an oil or gas reservoir. The results of the method 140 can be used as an input to build geologically realistic simulation models (e.g., models of oil reservoirs).

Properties of the subsurface formation, such as porosity, are measured at a plurality of locations (step 142) by, for example, drilling test wells and logging the data gathered from the test well. Values of these properties can also be obtained from previously drilled wells or well logs. Core sampling is another method that could be used to measure the properties. Other commonly used data include attributes derived from seismic inversion and interpretation results from image logs, such as fracture densities and fracture apertures. Site-specific data are not limited to the underground formations but could be measured on the ground or even in the air, for example, soil pollution and air quality. In some instances, the values of the properties of the subsurface location have been collected previously and stored, for example, in a database and do not need to be measured as a part of this method 140. In implementations of the method 140 that acquire measurements of the property of the subsurface formations, the values of the property being measured from a plurality of locations are stored in a database (step 144).

FIG. 3 shows an example plot of a plurality of well locations 160 where the porosity of the subsurface formation has been measured. In some cases, the plurality of locations where the property of the subsurface formation is measured are not uniformly distributed across the region of interest. Some portions of the region of interest may be oversampled while some may be under sampled. In some regions shown, measurement locations are close to each other while in other regions the locations are sparser. The summary statistics (e.g., mean, standard deviation, etc.) of the resulting set of measurements may then be unrepresentative of the true values of the properties of the subsurface formation.

Figure 4:
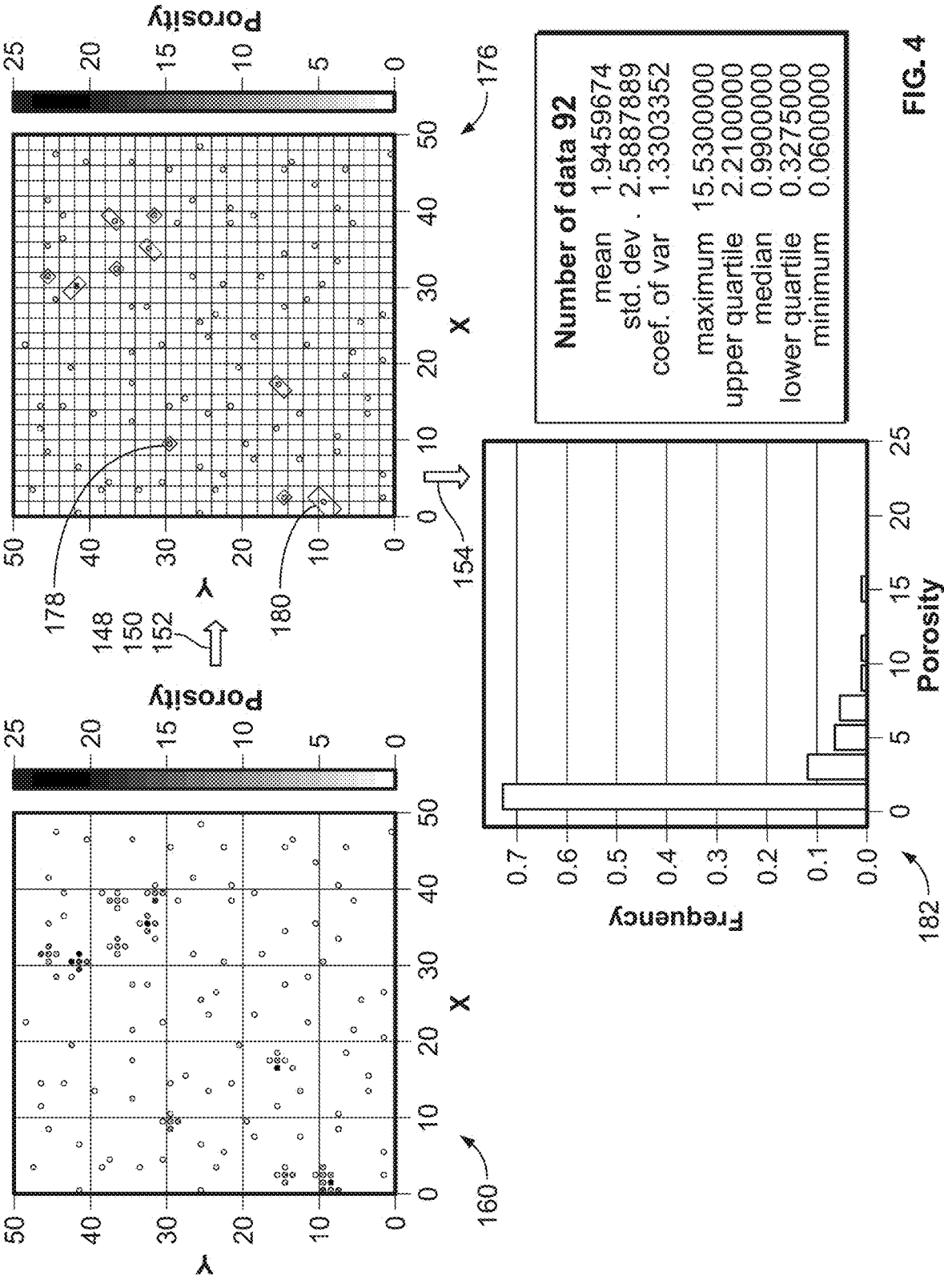
FIG. 4 shows results from another example implementation of a characterization method.

The method 140 defines a distance of influence for the measured property in the subsurface formation based on the property and a degree of heterogeneity of the subsurface formation (step 146). This distance defines an appropriate amount of separation between measurement locations to help reduce biases in the dataset due to oversampling. The distance of influence can be the same in each direction. For example, in FIG. 3, a distance of influence of 2 units is used along both the x and y directions. In other implementations, the distance of influence may be different in different directions. FIG. 4 shows another example set of results from the method 140 wherein the distance of influence along the x direction is defined as 2 units while the distance of influence along the y direction is defined as 3 units. The directions in which the distance of influence can be defined are not limited to only x and y directions. For example, a polar coordinate system could be used where the distance of influence is defined by a radius from the measurement location at various angles around the location such as 45 degrees, 60 degrees, or 135 degrees. The selected angle can be in line with the main geological feature, such as channel orientation. For example, the selected angle can follow the heterogeneity direction to preserve the high-low trend of the selected reservoir property. For a homogenous reservoir, a larger distance of influence could be applied.

In some implementations of the method 140, the distance of influence can depend on the underlying geology. For stable geological environments, such as shoreface, this distance of influence could be larger than the size of the fluvial environment. In some instances, the distance of influence can be defined based on a continuous property of the formation, where a continuous property is a property that changes smoothly throughout the formation. Examples of continuous properties include porosity, permeability, and water saturation. In some cases, wireline logs such as gamma ray wireline logs can be used to define the distance of influence. In some implementations, interpreted properties such as fracture density or aperture can be used to define the distance of influence. In some implementations defining the distance of influence can include collaboration between different job functions, including sedimentologists, geostatisticians, and geological modelers. Such collaboration can to a more accurate estimation of the reservoir property at the whole reservoir level. In some implementations, defining the distance of influence can include assessing a reservoir heterogeneity of the subsurface formation and comparing the spacing of the locations where the property has been measured.

Following the definition of the distance of influence (step 146), clusters of locations that are located within the distance of influence of each other are identified (step 148). For each cluster identified, an average value of the property of the subsurface formation in the cluster is calculated (step 150). In one implementation, the average value is calculated using equal weights for each location within the cluster. For example, if L clusters of locations are identified, for a property z, the average value of the property of the $l^{th}$ cluster, $z_l$, where $l \in [1, L]$ can be calculated as follows:

$$z_l = \sum_{i=1}^{n_l} \frac{z_i}{n_l},$$

where $n_l$ is the number of locations within the $l^{th}$ cluster, and $z_i$ is the value of the property at the $i^{th}$ location within the $l^{th}$ cluster. In this example, if the number of locations within the cluster is 1, then the average value of the cluster will be equal to the measured value of the property at the specified location. In other implementations, a different weighting scheme could be used when calculating the average value of the cluster. For example, the weight can be determined based on the influence area of each sample. A vertical cell size can also be used (e.g., a value in a small cell could have a smaller weight than a value in a larger cell).

For each cluster identified, multiple values of the property and locations are replaced with the average value of the property of the subsurface formation in the cluster at a single location (step 152) defining a reduced data set. In other words, each cluster is represented by a single value equal to the calculated average value of the property for the cluster. The removal of clusters from the data set is a way to overcome biases that may have been introduced by oversampling the property of the subsurface formation in some portions of the region of interest. With the clusters removed, summary statistics, can be calculated for the reduced data set (step 154). For example, the declustered mean $\bar{z}$ and standard deviation s can be calculated as $$\bar{z} = \sum_{l=1}^{L} w_l z_l \text{ and } s = \sqrt{\sum_{l=1}^{L} w_l (z_l - \bar{z})^2},$$

where $w_l$ is a weight greater than zero that can be applied for each cluster. In the example where all clusters receive equal weighting, $w_l = 1/L$.

Continuous reservoir properties, such as porosity and permeability, are commonly simulated using, for example, a Sequential Gaussian Simulation (SGS) algorithm, which reproduces a specified input mean value of the property, for example the mean calculated in step 154 of the method 140. The simulated model mean should be very close to the specified input mean, which can be derived from measured properties from a plurality of locations.

FIG. 3 shows a plot of a reduced set of measurement locations 164 after an implementation of the method 140 over the original set of measurement locations 160. A bounding box for a cluster 166 is shown in the plot of the reduced set of measurement locations 164. In this example, the cluster 166 contained 5 locations within the distance of influence of 2 units of each other in both the x and y directions. In the plot 164, the values of the porosity at the 5 locations within the cluster 166 are represented by the single average value of the cluster at the average location of the locations within the cluster. In this example, the original set of measurement locations 160 contained 140 well locations where the porosity of the subsurface formation was measured. After the implementation of the method 140, the number of locations is 97. Summary statistics are calculated for the reduced set of measurement locations 166. The histogram 170 of the porosity values from the reduced set of measurement locations is also shown. In this example, the mean value of porosity is 2.12% with a standard deviation of 2.90%.

FIG. 4 shows another example of a reduced set of measurement locations 176 after implementation of the method 140 on the original set of measurement locations 160. In this example, the distance of influence along the x direction is defined as 2 units while the distance of influence along the y direction is defined as 3 units. In some areas of the region of interest, a cluster 178 encompasses the same measurement locations as when equal distances of influence are applied in each direction. The effects of the unequal distances of influence in separate directions are seen in a different cluster 180. Here, the equal distance of influence in FIG. 3, identified two clusters in the reduced set of measurement locations 164, while the unequal distances of influence of FIG. 4 identify only a single cluster. When the distance of influence is tied to the underlying geology of the subsurface formation, using such unequal distances of influence can further reduce sampling biases. The reduced set of measurement locations 176 have reduced the number of locations from 140 to 92. In this example, the histogram 182 of the reduced set of measurement locations 176 and the corresponding summary statistics, show that the mean porosity has been reduced to 1.96% with a standard deviation of 2.59%.

In some implementations, changing the distance of influence can also change the estimated property mean as seen when comparing the example implementations of FIG. 3 and FIG. 4. In some cases, a user can calculate summary statistics using multiple values of the distance of influence and select the distance of influence, which is believed to represent the reservoir the best, or use several distances of influence for different scenarios for uncertainty quantification.

The method 140 is different than other declustering techniques such as cell-based declustering or polygonal declustering in a few key ways. The method 140 can be more stable than other techniques since the method 140 is based on the configuration of the data itself by using a distance of influence instead of a discretization of the region of interest and further does not depend on an arbitrary selection of an origin for the discretization. The method 140 is also not influenced by boundary conditions at the edges of the region of interest. The method 140 can also couple the measurement locations with the underlying geology which may lead to more accurate estimation of the true global mean and target histogram of the region of interest. More accurate statistics can, for example, lead to more accurate estimations of reservoir volumetrics.

Figures 5A, 5B:
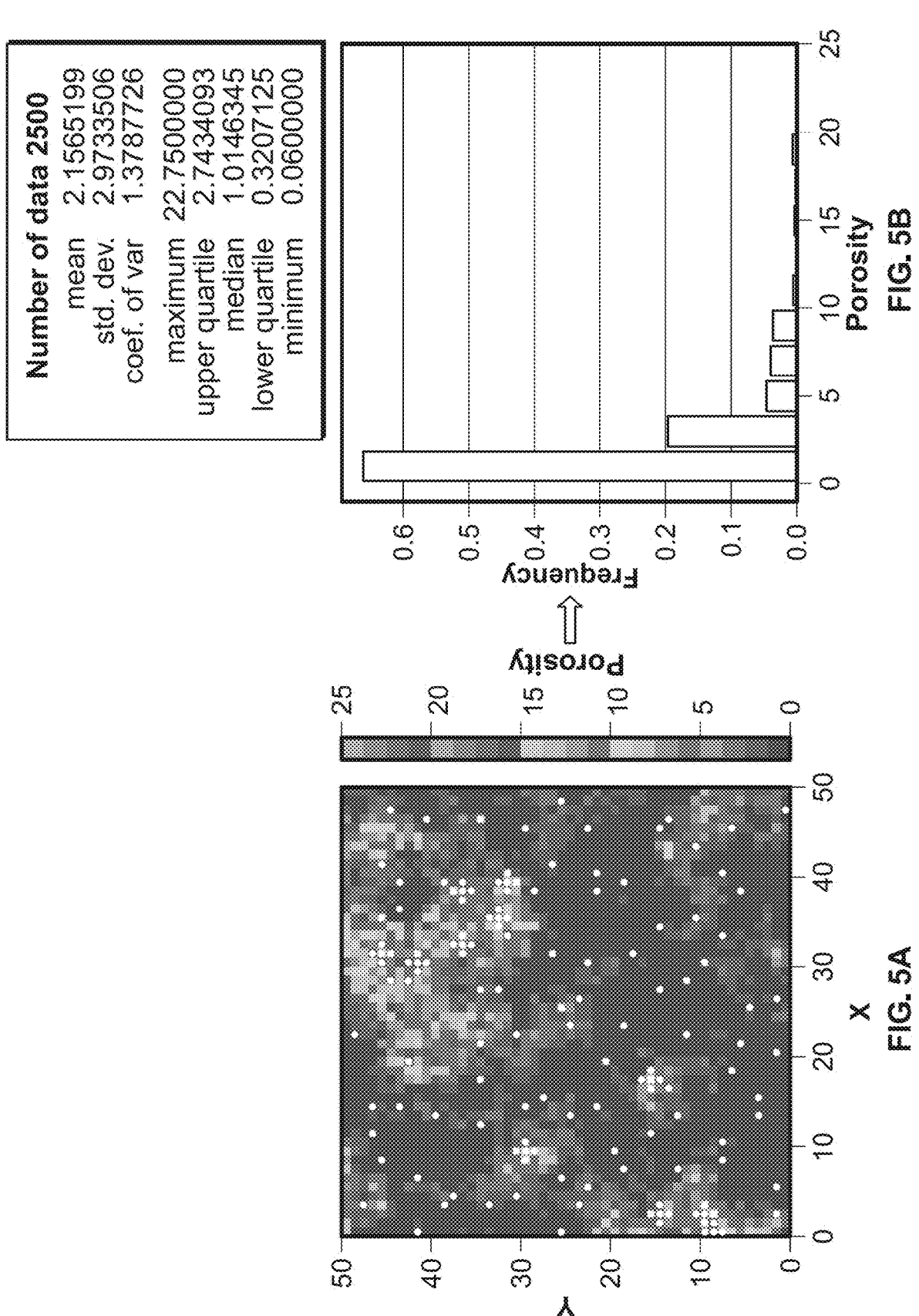
FIG. 5A-5D shows a demonstration set of measurement locations of a property of a subsurface formation.
Figures 5C, 5D:
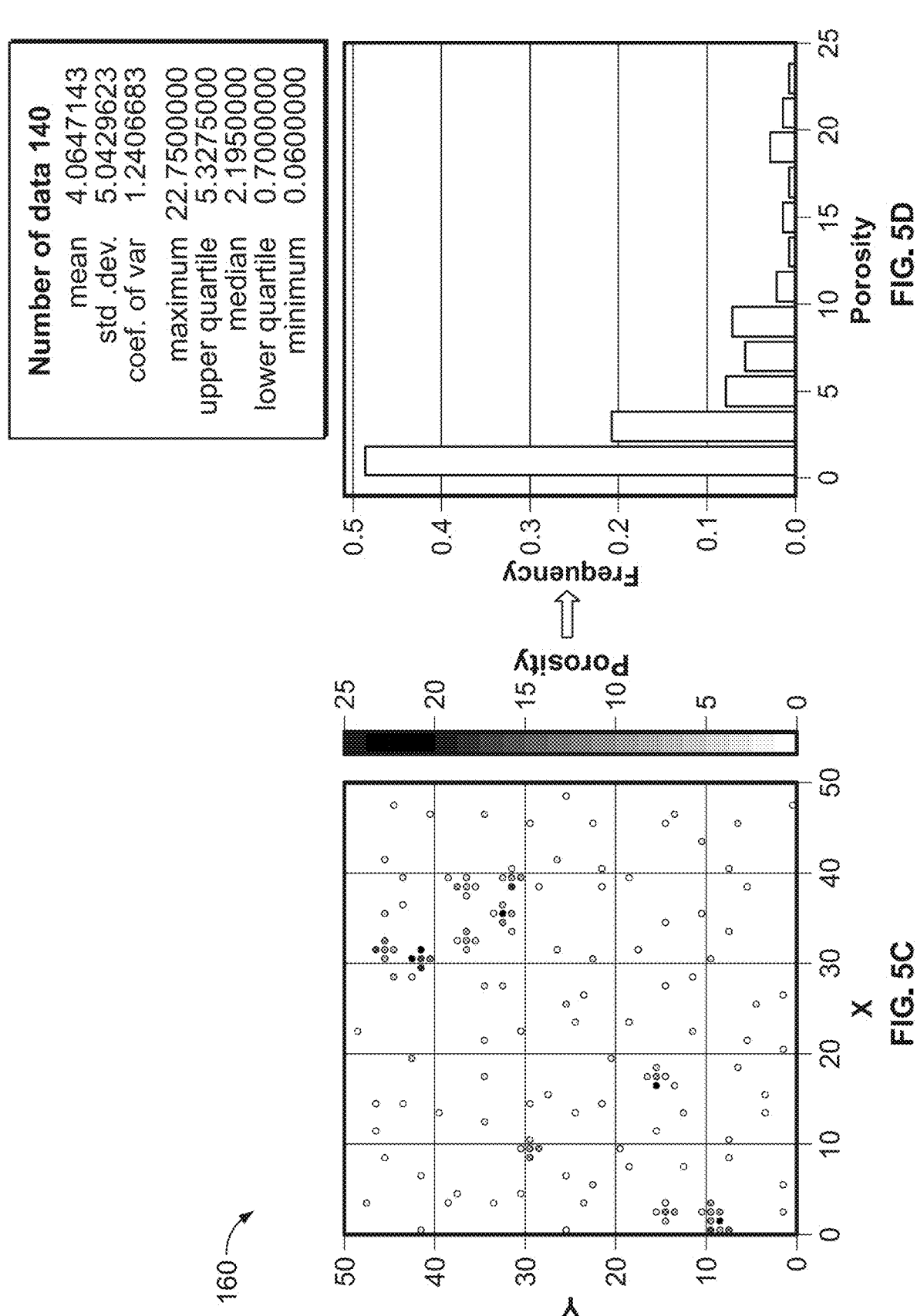

FIGS. 5A-5D presents a synthetic demonstration set of measurement locations with which the results of the implementation of the method 140 can be compared. FIG. 5A shows the true values of the porosity of the underlying geological formation for a sample mud-rich poor reservoir. FIG. 5B shows the histogram and summary statistics from the set of true data shown in FIG. 5A. The mean porosity of the subsurface formation is calculated to be 2.17% with a standard deviation of 2.97% utilizing 2500 data samples. FIG. 5C shows a set of measurement locations 160 of the 140 wells spread throughout the region of interest. The measurements from these 140 locations are used in the comparative analysis of the method 140. FIG. 5D shows the histogram and summary statistics based on an equal-weighted average of all 140 measurement locations where no declustering method has been employed. The mean porosity is 4.06% with a standard deviation of 5.04%. The presence of sampling bias is evident when comparing the true values of the mean and standard deviation of the underlying formation shown in FIG. 5B with the equal-weighted average with no declustering shown in FIG. 5D. The equal-weighted mean and standard deviation of FIG. 5D are substantially higher than the true values. This could lead to significant errors when modelling an oil reservoir within the subsurface formation. When such a reservoir property mean value is used as the target of the whole model, it can result in an incorrect reservoir reserve estimation and inappropriate production strategies for the formation.

Referring to FIG. 3, the example implementation of the method 140, yields a histogram 170 with a mean porosity value of 2.12% and standard deviation of 2.90%. Here the distance of influence is 2 units in both the x and y directions. This is a substantial improvement over the equal weighted average of the original set of measurement locations 160 without declustering.

Referring to FIG. 4, the example implementation of the method 140 with a distance of influence of 2 units in the x direction and 3 units in the y direction yields a histogram 182 with a mean porosity value of 1.95% and a standard deviation of 2.55%. These values are further reduced from the example in FIG. 3, and a substantial improvement over the values from FIG. 5D. When compared with the true values shown in FIG. 5B, the histogram 182 has slightly lower mean and standard deviation values which may lead to a more conservative estimate of an oil reservoir in the underlying geological formation.

Cell-based declustering is a technique that identifies clusters in data and weights statistics based on the number of samples that lie in a defined area called a cell. An average value is calculated for each cell containing a data point. When more than one data sample lies within a given cell, an average value of the data is used for that cell. Typically, data within a cell will be averaged using equal weights.

Figure 6:
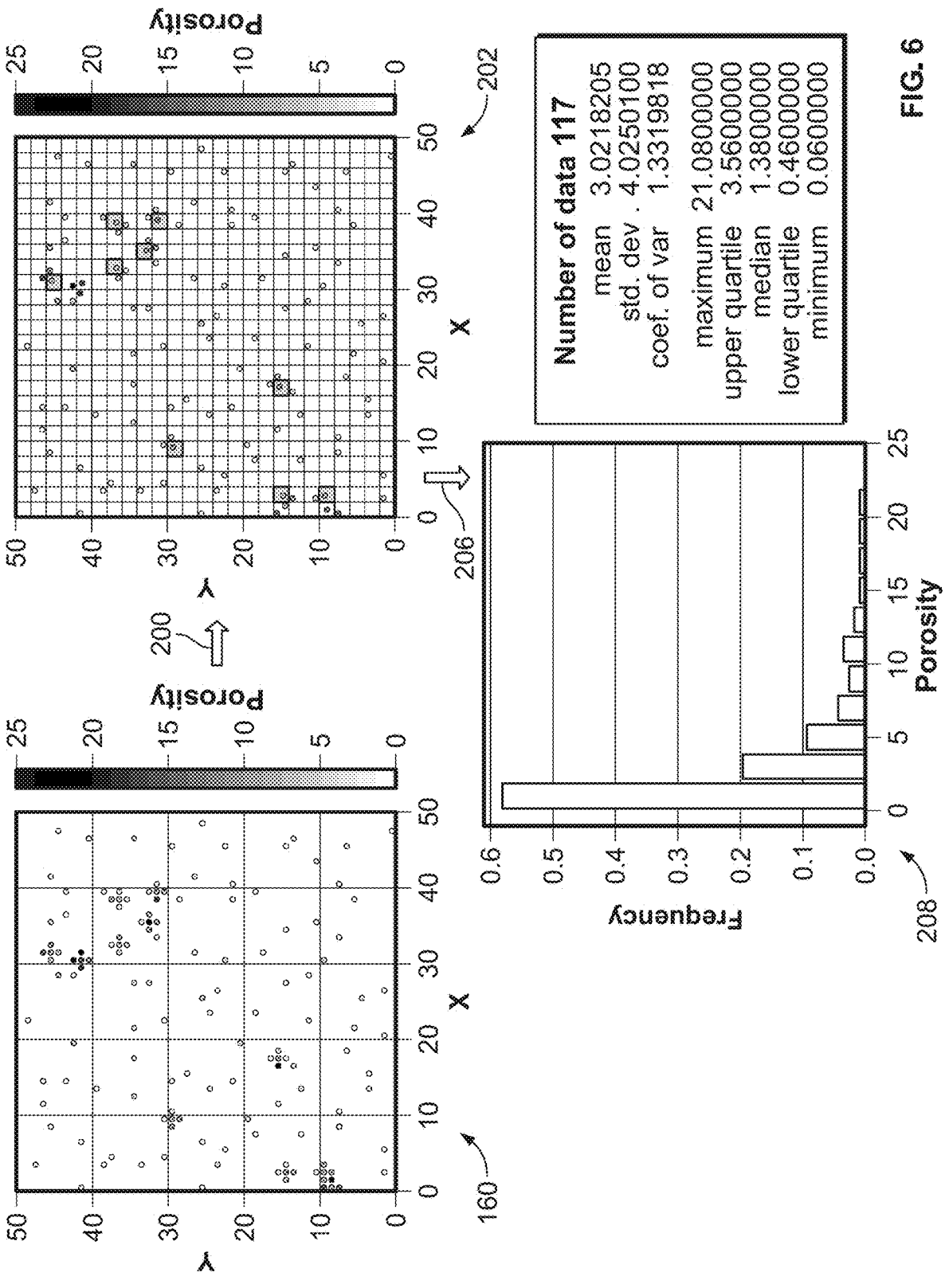
FIG. 6 shows results of a cell-based declustering method.

FIG. 6 shows an example of cell-based declustering 200 applied to the original set of measurement locations 160. Here a reduced set of measurement locations 202 is generated based on a 2×2 grid of cells. Cells that contained more than one data point in in the original set of measurement locations 160 are shaded. In this case, data points are clustered based solely on a discretization of the region of interest without respect to any inherent structure or closeness of the data. There are several locations that are proximal to each other, but which occur in different cells and are thus not clustered. This means that while the cell-based declustering implementation has removed some biases due to oversampling, it has not fully declustered the data. The cell-based declustering (200) reduced the original set of measurement locations 160 from 140 locations to 117. The summary statistics are calculated 206 over the reduced set of measurement locations 202. The histogram 208 shows the probability distribution of porosity throughout the region of interest. Using this cell-based declustering implementation yields a mean porosity value of 3.02% and a standard deviation of 4.02%. Both values are improvements over the equal-weighted statistics shown in FIG. 5D but are inferior to the results of the implementation of the method 140 using a distance of influence to cluster data.

The results from a cell-based declustering implementation are heavily dependent on the size of the cell chosen and the location of the origin of the grid of cells and is consequently not very stable. For example, the reduced data set 202 would be different if the origin of the cells was shifted by 1 unit in any direction. An automated method of choosing the cell size may be employed wherein the cell-based declustering is performed for a large range of cell sizes and the optimal cell size is chosen based on the minimization of a metric such as the mean value. For the original set of measurement locations 160, a cell size of 5×5 minimizes the declustered mean giving a declustered mean of 2.52% porosity and a standard deviation of 2.74%. While these values improve over the 2×2 cell case, they are still inferior to the results of the method 140 of this disclosure and require more computing resources since the declustering technique needs to be applied many times. The cell-based declustering method also does not account for any features of the underlying geology.

Figures 7A, 7B, 7C:
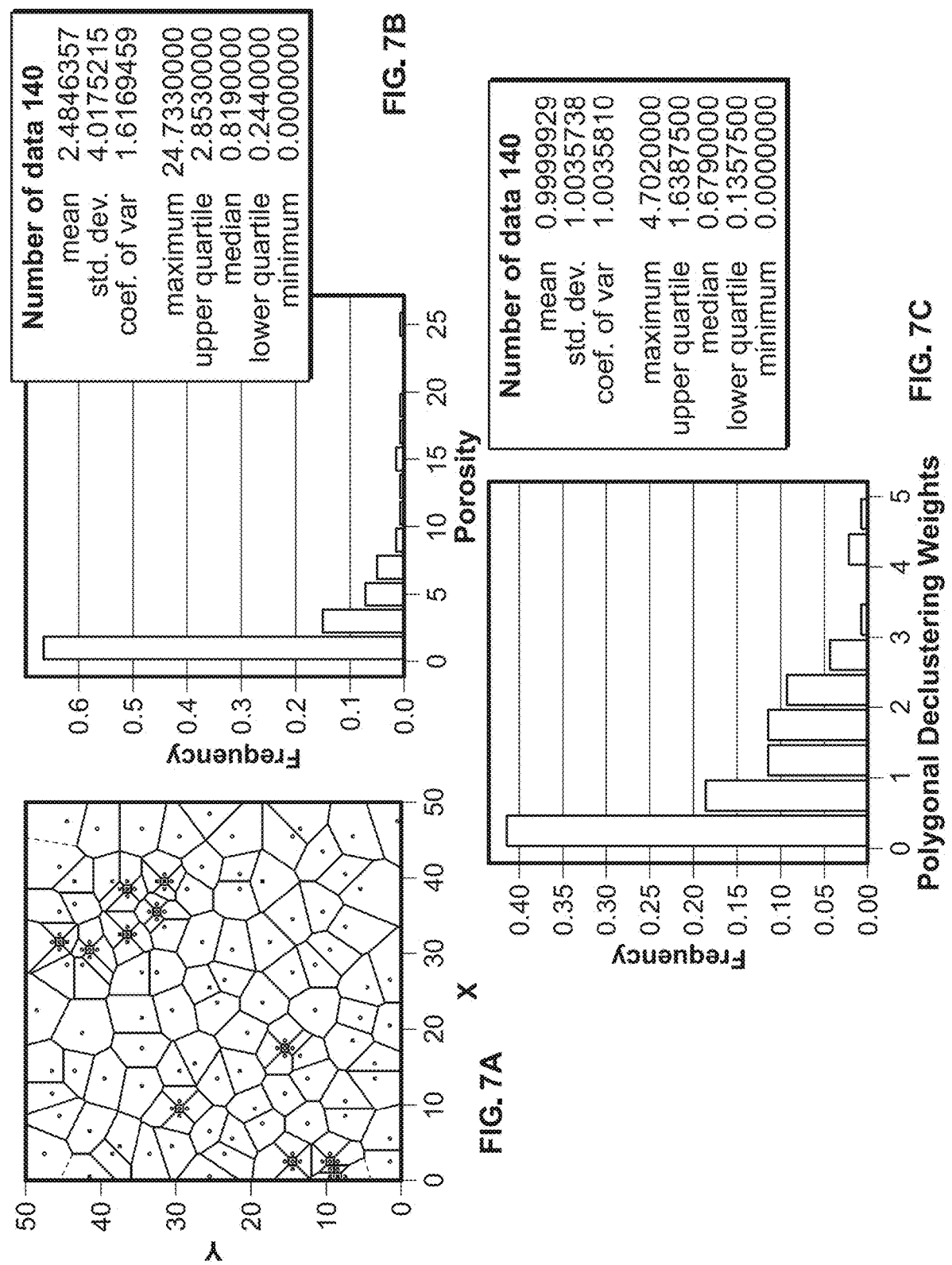
FIG. 7A-7C shows results of a polygonal declustering method.

FIGS. 7A-7C show the results of applying polygonal declustering to the original set of measurement locations shown in FIG. 5C. Polygonal declustering applies weights to each measurement location based on the influence volume of each datum. The entire region of interest is divided into polygons surrounding each data point to establish the area of influence of each data point. There are many algorithms that can be used to generate these polygons. In FIG. 7A, a Voronoi diagram generator was used to generate polygons around the measurement locations. Once polygons have been generated the area of each polygon $A_i$, $i \in [1, N]$, where N is the number of data points in the region of interest, is calculated. An average area of influence $\overline{A}$ is calculated for the entire data set. Weights for each data point are then calculated proportional to the average area (i.e., $w_i = A_i / \overline{A}$). Using the weights, summary statistics can be calculated. FIG. 7B shows the histogram and summary statistics using the weights calculated based on the polygons in FIG. 7A. The mean is reduced from 4.06% porosity in the original dataset to 2.48% porosity in the declustered data, and the standard deviation is reduced from 5.04% to 4.01%. These values are closer to the true values shown in FIG. 5B than the equal-weighted statistics of FIG. 5D and the cell-based declustering shown in FIG. 6; however, they are still inferior to the distance-based declustering method 140 of the present disclosure.

Using a polygonal declustering technique, the weights are proportional to the average area of all of the polygons; therefore, some weights are greater than 1.0 in for some measurement locations, especially for the bounding wells seen in FIG. 7A. FIG. 7C shows a histogram of the weights calculated based on the areas of influence in FIG. 7A. While most weights are less than one, there are some weights as high as 4.7. When changing boundary conditions, such as enlarging the region of interest, the influence areas may change significantly, especially for the bounding wells, giving undue influence to measurements around the periphery of the region of interest. Similar distortions can happen when the bounding box is rotated.

While the polygonal declustering technique utilizes the data configuration to define the weights and closeness of the data, it does not include a way to incorporate geological information about the subsurface formation. Since polygonal declustering is sensitive to boundary conditions, it is also less stable than the method 140 of the present disclosure which does not depend on boundary conditions.

Figure 8:
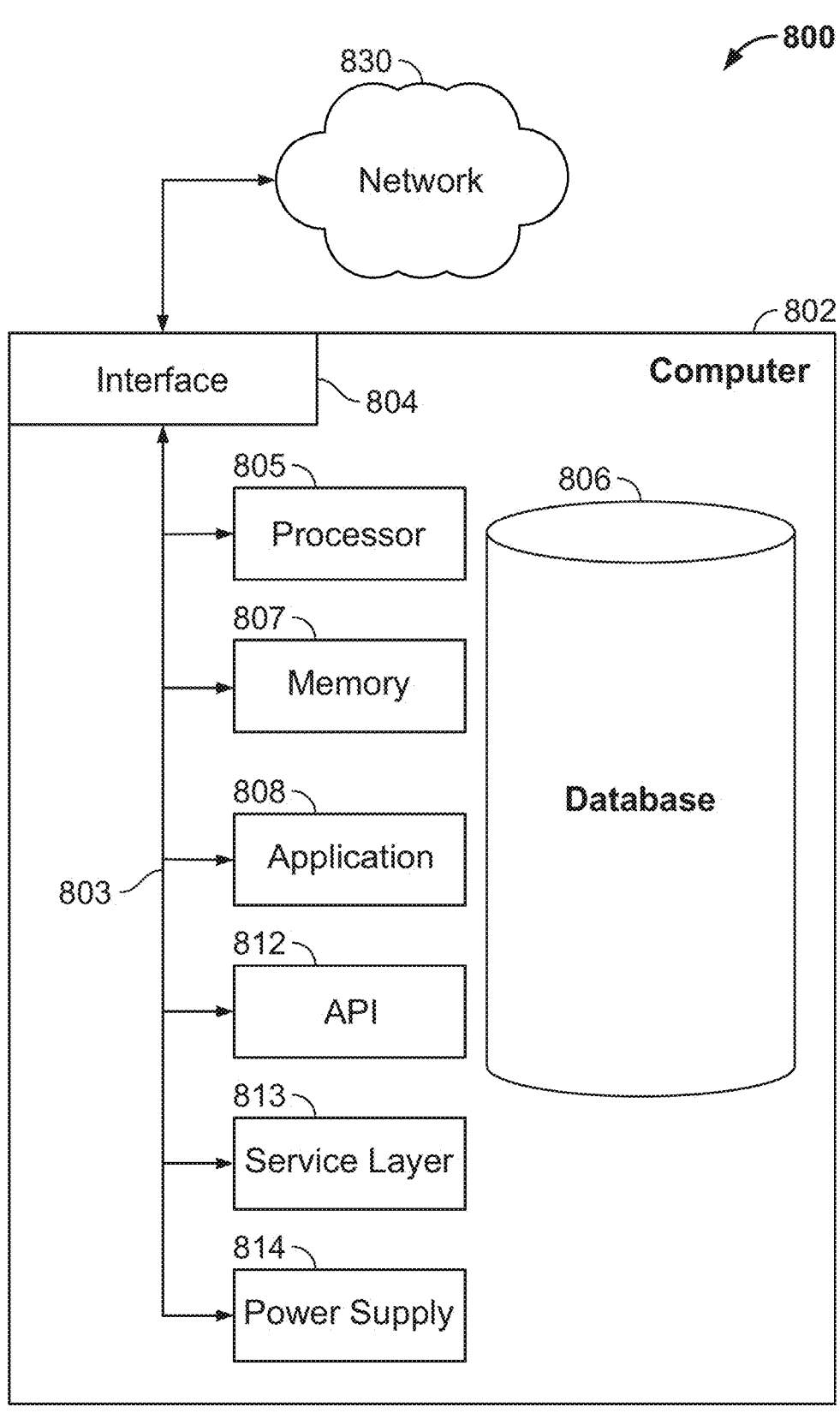
FIG. 8 is a block diagram illustrating an example computer system used to provide computational functionalities associated with described algorithms, methods, functions, processes, flows, and procedures according to some implementations of the present disclosure.

FIG. 8 is a block diagram of an example computer system 800 used to provide computational functionalities associated with described algorithms, methods, functions, processes, flows, and procedures described in the present disclosure, according to some implementations of the present disclosure.

The illustrated computer 802 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 802 can include input devices such as keypads, keyboards, and touch screens that can accept user information. Also, the computer 802 can include output devices that can convey information associated with the operation of the computer 802. The information can include digital data, visual data, audio information, or a combination of information. The information can be presented in a graphical user interface (UI) (or GUI).

The computer 802 can serve in a role as a client, a network component, a server, a database, a persistency, or components of a computer system for performing the subject matter described in the present disclosure. The illustrated computer 802 is communicably coupled with a network 830. In some implementations, one or more components of the computer 802 can be configured to operate within different environments, including cloud-computing-based environments, local environments, global environments, and combinations of environments.

Generally, the computer 802 is an electronic computing device operable to receive, transmit, process, store, and manage data and information associated with the described subject matter. According to some implementations, the computer 802 can also include, or be communicably coupled with, an application server, an email server, a web server, a caching server, a streaming data server, or a combination of servers.

The computer 802 can receive requests over network 830 from a client application (for example, executing on another computer 802). The computer 802 can respond to the received requests by processing the received requests using software applications. Requests can also be sent to the computer 802 from internal users (for example, from a command console), external (or third) parties, automated applications, entities, individuals, systems, and computers.

Each of the components of the computer 802 can communicate using a system bus 803. In some implementations, any or all of the components of the computer 802, including hardware or software components, can interface with each other or the interface 804 (or a combination of both), over the system bus 803. Interfaces can use an application programming interface (API) 812, a service layer 813, or a combination of the API 812 and service layer 813. The API 812 can include specifications for routines, data structures, and object classes. The API 812 can be either computer-language independent or dependent. The API 812 can refer to a complete interface, a single function, or a set of APIs.

The service layer 813 can provide software services to the computer 802 and other components (whether illustrated or not) that are communicably coupled to the computer 802. The functionality of the computer 802 can be accessible for all service consumers using this service layer. Software services, such as those provided by the service layer 813, can provide reusable, defined functionalities through a defined interface. For example, the interface can be software written in JAVA, C++, or a language providing data in extensible markup language (XML) format. While illustrated as an integrated component of the computer 802, in alternative implementations, the API 812 or the service layer 813 can be stand-alone components in relation to other components of the computer 802 and other components communicably coupled to the computer 802. Moreover, any or all parts of the API 812 or the service layer 813 can be implemented as child or sub-modules of another software module, enterprise application, or hardware module without departing from the scope of the present disclosure.

The computer 802 includes an interface 804. Although illustrated as a single interface 804 in FIG. 8, two or more interfaces 804 can be used according to particular needs, desires, or particular implementations of the computer 802 and the described functionality. The interface 804 can be used by the computer 802 for communicating with other systems that are connected to the network 830 (whether illustrated or not) in a distributed environment. Generally, the interface 804 can include, or be implemented using, logic encoded in software or hardware (or a combination of software and hardware) operable to communicate with the network 830. More specifically, the interface 804 can include software supporting one or more communication protocols associated with communications. As such, the network 830 or the interface's hardware can be operable to communicate physical signals within and outside of the illustrated computer 802.

The computer 802 includes a processor 805. Although illustrated as a single processor 805 in FIG. 8, two or more processors 805 can be used according to particular needs, desires, or particular implementations of the computer 802 and the described functionality. Generally, the processor 805 can execute instructions and can manipulate data to perform the operations of the computer 802, including operations using algorithms, methods, functions, processes, flows, and procedures as described in the present disclosure.

The computer 802 also includes a database 806 that can hold data, including values of properties of subsurface formations (for example, values of properties of subsurface formations described earlier at least with reference to FIG. 1), for the computer 802 and other components connected to the network 830 (whether illustrated or not). For example, database 806 can be an in-memory, conventional, or a database storing data consistent with the present disclosure. In some implementations, database 806 can be a combination of two or more different database types (for example, hybrid in-memory and conventional databases) according to particular needs, desires, or particular implementations of the computer 802 and the described functionality. Although illustrated as a single database 806 in FIG. 8, two or more databases (of the same, different, or combination of types) can be used according to particular needs, desires, or particular implementations of the computer 802 and the described functionality. While database 806 is illustrated as an internal component of the computer 802, in alternative implementations, database 806 can be external to the computer 802.

The computer 802 also includes a memory 807 that can hold data for the computer 802 or a combination of components connected to the network 830 (whether illustrated or not). Memory 807 can store any data consistent with the present disclosure. In some implementations, memory 807 can be a combination of two or more different types of memory (for example, a combination of semiconductor and magnetic storage) according to particular needs, desires, or particular implementations of the computer 802 and the described functionality. Although illustrated as a single memory 807 in FIG. 8, two or more memories 807 (of the same, different, or combination of types) can be used according to particular needs, desires, or particular implementations of the computer 802 and the described functionality. While memory 807 is illustrated as an internal component of the computer 802, in alternative implementations, memory 807 can be external to the computer 802.

The application 808 can be an algorithmic software engine providing functionality according to particular needs, desires, or particular implementations of the computer 802 and the described functionality. For example, application 808 can serve as one or more components, modules, or applications. Further, although illustrated as a single application 808, the application 808 can be implemented as multiple applications 808 on the computer 802. In addition, although illustrated as internal to the computer 802, in alternative implementations, the application 808 can be external to the computer 802.

The computer 802 can also include a power supply 814. The power supply 814 can include a rechargeable or non-rechargeable battery that can be configured to be either user- or non-user-replaceable. In some implementations, the power supply 814 can include power-conversion and management circuits, including recharging, standby, and power management functionalities. In some implementations, the power-supply 814 can include a power plug to allow the computer 802 to be plugged into a wall socket or a power source to, for example, power the computer 802 or recharge a rechargeable battery.

There can be any number of computers 802 associated with, or external to, a computer system containing computer 802, with each computer 802 communicating over network 830. Further, the terms "client," "user," and other appropriate terminology can be used interchangeably, as appropriate, without departing from the scope of the present disclosure. Moreover, the present disclosure contemplates that many users can use one computer 802 and one user can use multiple computers 802.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship. Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

Particular embodiments of the subject matter have been described. Other embodiments are within the scope of the following claims. For example, the actions recited in the claims can be performed in a different order and still achieve desirable results. As one example, some processes depicted in the accompanying figures do not necessarily require the particular order shown, or sequential order, to achieve desirable results.

What is claimed is:

1. A method for characterizing a subsurface formation, the method comprising:
   measuring a property of the subsurface formation at a plurality of locations;
   storing values of the property of the subsurface formation at the plurality of locations in a database;
   defining a distance of influence for the property in the subsurface formation based on the property and on a degree of heterogeneity of the subsurface formation;
   identifying clusters of locations that are located within the distance of influence of each other;
   for each cluster identified, calculating an average value of the property of the subsurface formation in the cluster;
   defining a reduced data set by, for each cluster identified, replacing multiple values of the property and locations of the identified cluster with the average value of the property of the subsurface formation in the cluster at a single location; and
   calculating summary statistics of the reduced data set,
   wherein measuring the property of the subsurface formation comprises drilling a test well in the subsurface formation.

2. The method of claim 1, further comprising logging the test well in the subsurface formation.

3. The method of claim 1, wherein the property is a continuous property of the formation.

4. The method of claim 1, wherein the distance of influence varies with direction.

5. The method of claim 1, wherein defining a distance of influence comprises assessing a reservoir heterogeneity and a main depositional direction.

6. The method of claim 1, wherein the average value for a cluster of locations is based on an equal weighting of the values of the property at the locations of the cluster of locations.

7. The method of claim 1, wherein the distance of influence of the property is different in different directions.

8. The method of claim 1, further comprising, modelling an oil reservoir within the subsurface formation.

9. A system for characterizing a subsurface formation, the system comprising:

one or more processing devices and one or more non-transitory machine-readable storage devices storing instructions that are executable by the one or more processing devices to cause performance of operations comprising:

defining a distance of influence for a property in the subsurface formation based on the property and on a degree of heterogeneity of the subsurface formation;

identifying clusters of locations within a plurality of locations where the property has been measured that are located within the distance of influence of each other;

for each cluster identified, calculating an average value of the property of the subsurface formation in the cluster;

defining a reduced data set by, for each cluster identified, replacing multiple values of the property and locations of the identified cluster with the average value of the property of the subsurface formation in the cluster at a single location; and calculating summary statistics of the reduced data set, wherein measuring the property of the subsurface formation comprises drilling a test well in the subsurface formation.

10. The system of claim 9, wherein the distance of influence varies with direction.

11. The system of claim 9, wherein defining a distance of influence comprises comparing a spacing of the plurality of locations and the degree of heterogeneity of the subsurface formation.

12. The system of claim 9, wherein the average value for a cluster of locations is based on an equal weighting of the values of the property at the locations of the cluster of locations.

13. The system of claim 9, wherein the distance of influence of the property is different in different directions.

14. The system of claim 9, further comprising, modelling an oil reservoir within the subsurface formation.

15. One or more non-transitory machine-readable storage devices storing instructions for characterizing a subsurface formation, the instructions being executable by one or more processing devices to cause performance of operations comprising:

defining a distance of influence for a property in the subsurface formation based on the property and on a degree of heterogeneity of the subsurface formation;

identifying clusters of locations within a plurality of locations where the property has been measured that are located within the distance of influence of each other;

for each cluster identified, calculating an average value of the property of the subsurface formation in the cluster;

defining a reduced data set by, for each cluster identified, replacing multiple values of the property and locations of the identified cluster with the average value of the property of the subsurface formation in the cluster at a single location; and calculating summary statistics of the reduced data set, wherein measuring the property of the subsurface formation comprises drilling a test well in the subsurface formation.

16. The machine-readable storage devices of claim 15, wherein the operations further comprise: defining a distance of influence that varies with direction.

17. The machine-readable storage devices of claim 15, wherein the operations further comprise: defining a distance of influence comprises comparing a spacing of the plurality of locations and the degree of heterogeneity of the subsurface formation.

18. The machine-readable storage devices of claim 15, wherein the operations further comprise: defining the distance of influence of the property to be different in different directions.

19. The machine-readable storage devices of claim 15, wherein the operations further comprise: modelling an oil reservoir within the subsurface formation.

* * * * *